United States Patent
Carlson

(10) Patent No.: US 7,181,575 B2
(45) Date of Patent: Feb. 20, 2007

(54) INSTRUCTION CACHE USING SINGLE-PORTED MEMORIES

(75) Inventor: Richard L. Carlson, Fort Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 371 days.

(21) Appl. No.: 10/953,669

(22) Filed: Sep. 29, 2004

(65) Prior Publication Data

US 2006/0069873 A1 Mar. 30, 2006

(51) Int. Cl.
*G06F 13/00* (2006.01)

(52) U.S. Cl. ...................... 711/140; 711/125

(58) Field of Classification Search .............. 711/125, 711/140
See application file for complete search history.

(56) References Cited

U.S. PATENT DOCUMENTS

| | | | |
|---|---|---|---|
| 5,497,470 A * | 3/1996 | Liencres ........................ 711/3 |
| 5,717,896 A * | 2/1998 | Yung et al. .................. 712/205 |
| 6,351,802 B1 | 2/2002 | Sheaffer |
| 6,397,296 B1 | 5/2002 | Werner |
| 6,507,892 B1 | 1/2003 | Mulla et al. |
| 6,539,457 B1 | 3/2003 | Mulla et al. |
| 6,557,078 B1 | 4/2003 | Mulla et al. |
| 6,704,820 B1 | 3/2004 | Walker et al. |
| 2001/0044881 A1 | 11/2001 | Fu et al. |
| 2002/0069326 A1 | 6/2002 | Richardson et al. |
| 2003/0163643 A1 | 8/2003 | Riedlinger et al. |
| 2003/0204680 A1 | 10/2003 | Hardage, Jr. |

* cited by examiner

Primary Examiner—Reba I. Elmore

(57) ABSTRACT

Systems, methodologies, media, and other embodiments associated with cache systems are described. One exemplary system embodiment includes an instruction cache comprising single-ported memories. The example system can further include a cache control logic configured to process cache events of different types that may be received by the instruction cache, and being configured with a multi-stage pipeline that coordinates processing of the cache events to the single-ported memories. The multi-stage pipeline can have different stages pre-assigned as read/write stages for the cache events to minimize access conflicts between the cache events.

30 Claims, 12 Drawing Sheets

| Cache State | Valid Bit | Pending Bit |
|---|---|---|
| Invalid | 0 | 0 |
| Killed | 0 | 1 |
| Shared | 1 | 0 |
| Pending | 1 | 1 |

INSTRUCTION CACHE USING SINGLE-PORTED MEMORIES

BACKGROUND

As processor speed continues to increase at a faster rate than memory speed, memory speed has become increasingly important. A cache is a type of buffer that is smaller and faster than main memory, and is typically disposed between the processor and the main memory. To improve memory speed, the cache stores a copy of instructions and/or data from the main memory that are likely to be needed next by the processor.

A cache can store instructions that were copied from the main memory in cache lines. A cache line may store one or many consecutive instructions. Each cache line can have a tag entry that is used to identify the memory address of the copied instructions. In its simplest form, a tag is the minimal portion of the address needed to uniquely identify the copied instructions. Other forms of tags can include encoded addresses.

A cache hit occurs when a requested instruction is present in the cache. A cache miss occurs when the requested instruction is not stored in the cache. Typically, when a cache miss occurs, the execution unit of the processor must wait or stall until the requested instruction is retrieved from the main memory before continuing the execution of the program, causing processor performance to degrade. The number of cache hits and misses can be used as a measure of computer system performance.

Multi-level cache structures may have two or more independent cache memories such as L0 and L1 caches (Level 0 cache and Level 1 cache). These cache memories can have different sizes and have different speeds or memory latency access time. Typically, higher level caches (e.g. L1 cache) store more instructions but are slower to access than lower level caches (e.g. L0 cache).

To optimize microprocessor performance, an instruction cache should deliver instructions with the lowest possible latency, and with throughput at least as high as the instructions can be processed by an instruction fetch unit. Some prior cache designs attempt to achieve these goals by using multi-ported memories that allow multiple, simultaneous accesses to the memories. For example, the designs may implement the tag array using 3-ported memory array cells, and the data array using 2-ported memory array cells where each port into a memory array can independently access any piece of data in that memory array. In this way, various types of accesses and cache events such as hits, fills, and snoops can be processed without interfering with other events. However, this approach results in higher design complexity, larger chip area, and greater power consumption.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Figure 1:
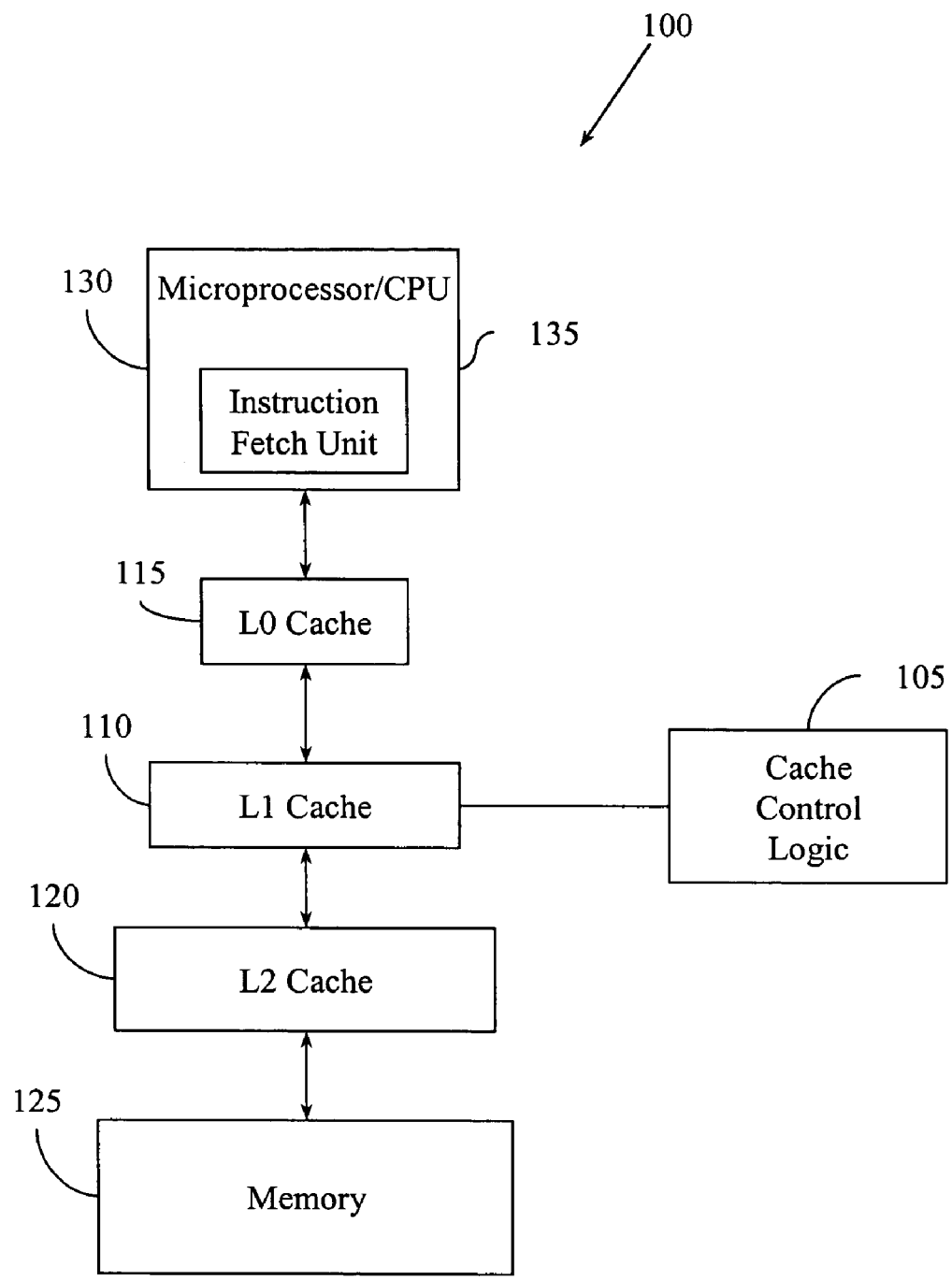
FIG. 1 illustrates an example configuration of a microprocessor cache system.

As will be described with various examples herein, a cache architecture, as well as other systems and methods, are provided with a functional multi-stage pipeline that defines a sequence of operations for processing cache events. The pipeline can be used to minimize access conflicts and to simplify memory arrays of the cache. The example cache architecture allows single-ported tag and data memories to be used, which are simpler and smaller than multiple-ported memories. The single-ported memories of the cache can also provide full throughput and nearly as low access latency as a multiple-ported design.

Based on one or more of the example cache configurations described herein, possible cache operations can have access to the single-ported tag and data arrays, and other limited-access resources within a cache, when access is requested by the operations. One limited-access resource includes a request address queue. Once cache operations are started down the multi-stage pipeline, the cache operations will complete with a fixed timing sequence, without stalls, delays, or conflicts with other operations that might be in progress.

The following includes definitions of selected terms employed herein. The definitions include various examples and/or forms of components that fall within the scope of a term and that may be used for implementation. The examples are not intended to be limiting. Both singular and plural forms of terms may be within the definitions.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like an application specific integrated circuit (ASIC), an analog circuit, a digital circuit, a programmed logic device, a memory device containing instructions, or the like. Logic may include one or more gates, combinations of gates, one or more chips, or other circuit components. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. Typically, an operable connection includes a physical interface, an electrical interface, and/or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical and/or physical communication channels can be used to create an operable connection.

"Signal", as used herein, includes but is not limited to one or more electrical or optical signals, analog or digital signals, data, one or more computer or processor instructions, messages, a bit or bit stream, or other means that can be received, transmitted and/or detected.

Some portions of the detailed descriptions that follow are presented in terms of algorithms and symbolic representations of operations on data bits. These descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like.

It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. Unless specifically stated otherwise, it is appreciated that throughout the description, terms like processing, computing, maintaining, calculating, determining, or the like, refer to actions and processes of a computer system, logic, processor, or similar electronic device that manipulates and/or transforms data represented as physical (electronic) quantities.

Example systems, methods, and other embodiments are described herein related to cache memories, control of cache memories, microprocessors and computing devices that include cache memories. One example system includes a cache control logic that can be configured with a multi-stage pipeline. The multi-stage pipeline can include a set of stages that pre-define a sequence of operations for each cache event to minimize access conflicts between the cache events. The cache events can include, for example, lookup requests, fill requests, and snoops (e.g., inquiry and invalidation requests). With the example systems and methods of the cache control logic, single-ported cache memories can be implemented that can be simpler and smaller than multi-ported memories.

Illustrated in FIG. 1 is one example of a cache system 100 that includes a cache control logic 105 and an instruction cache memory like L1 cache 110. The cache system 100 can also include multiple cache memories such as L0 cache 115 and L2 cache 120, and a memory 125 that are operably connected to a microprocessor 130 and an instruction fetch unit 135. L0, L1, and L2 represent Level 0, Level 1 and Level 2 cache memories, respectively. It will be appreciated that the cache system 100 is not limited to a particular number of cache memories or hierarchy, and that the cache control logic 105 can be configured to operate with other cache memories. It will also be appreciated that FIG. 1 illustrates a logical configuration of the components and that one or more of the cache memories 110, 115, and 120 may or may not be on-chip with the microprocessor 130 based on desired design considerations.

In one example configuration, the L1 cache 110 is an instruction cache implemented using single-ported memory cells. The memory cells can be arranged into a data array configured to store instructions, and a tag array configured to store addresses to the instructions stored in the data array. The data array can be configured to operate independently from the tag array. For example, one array may be reading while the other is writing or is idle. The cache control logic 105 can be configured to process access requests (also referred to as cache events) of different types that may be received by the instruction cache 110. The cache control logic 105 can include a multi-stage pipeline (not shown) that coordinates processing of the access requests to the single-ported memory cells of the instruction cache 110.

In one example, the multi-stage pipeline can be defined with a number of stages that are sequentially cycled through according to a clock. Different stages can be pre-assigned to read or write memory cells or other resources for the various types of access requests to minimize conflicts between the access requests. As will be described in greater detail in the following examples, the multi-stage pipeline can include a set of stages that define a sequence of operations for each cache event. In other words, the stages can define sequences for processing different types of cache events in different stages to minimize access conflicts between the cache events that are trying to access single-ported memory cells or other resources within the cache memory 110.

For example, suppose the L1 cache memory 110 simultaneously receives a lookup request and a fill request. Each request has a specific sequence of operations that are performed to accomplish the request. If both requests attempt to access the cache memory at the same time, a conflict can occur. The pipeline can be designed to have selected stages assigned to the various operations of each type of request. The stage assignments can coordinate when a read and/or write access can occur for the different cache events to reduce or avoid a read/write access occurring in the same stage for different cache events.

With further reference to FIG. 1, a general explanation of the cache system 100 can be described as follows. The example cache system 100 can include a multi-level cache design having different size cache memories. The design can include having smaller caches located on-chip on the microprocessor 130 and having larger caches located off-chip. When data is requested by the microprocessor 130, the first level of cache (e.g. L0 cache 115) would be accessed first by the microprocessor 130 to determine whether a true cache hit is achieved for a memory access request. If a true cache hit is not achieved at the L0 cache 115, then a determination is made for the second level of cache (e.g., the L1 cache 110), and so on until the memory access request is satisfied by one of the cache memories. If the requested address is not found in any of the cache levels, the microprocessor 130 would send a request to the system's memory 125 in an attempt to satisfy the memory access request. The cache control logic 105 is configured to control the access requests that are received by the L1 cache 110 in the illustrated example.

Figure 2:
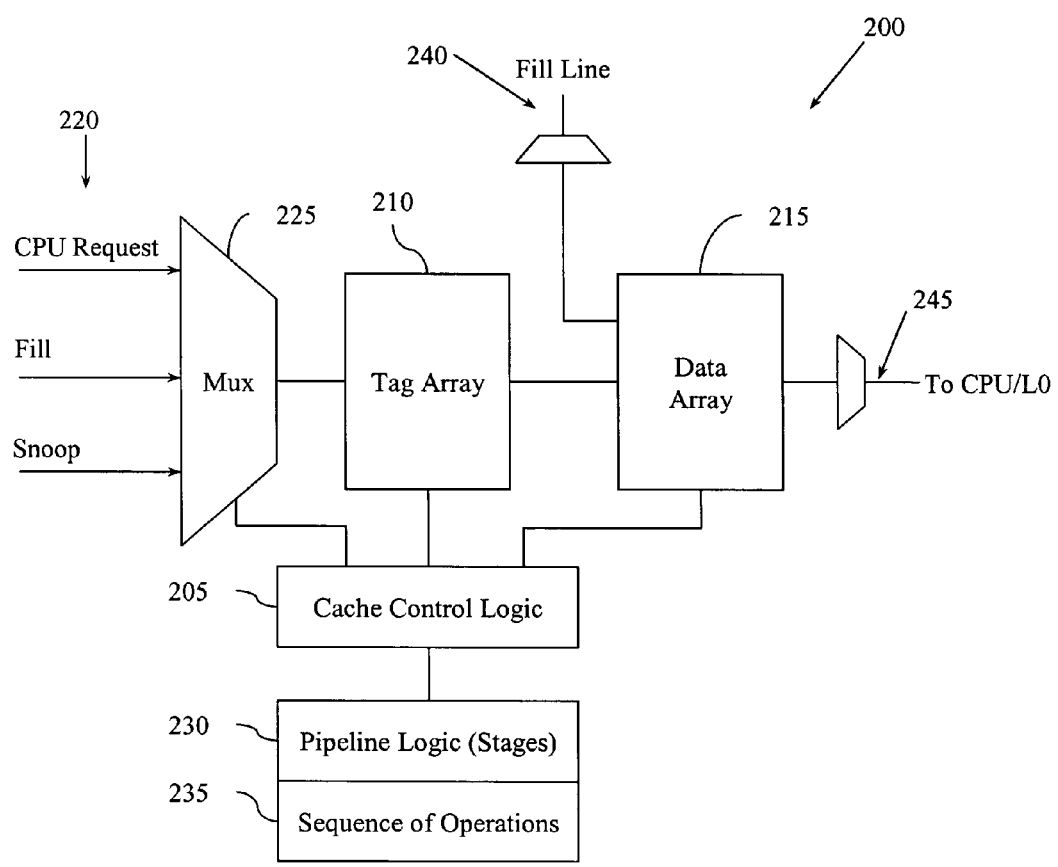
FIG. 2 illustrates an example configuration of a cache and a cache control logic.

Illustrated in FIG. 2 is one example configuration of an instruction cache system 200 including a cache control logic 205 that can be implemented for the L1 cache 110 and cache control logic 105 of FIG. 1. The instruction cache 200 can include a tag array 210 and a data array 215. The tag array 210 is configured to store control data, also known as tags, that indicate whether a desired address (e.g., an address required for a memory access request) is contained within the cache data array 215. In operation, when a memory access request is received by the cache 200, a tag is first obtained for the request. If the tag indicates that the desired address is contained within the data array 215, the data array 215 is accessed to satisfy the memory access request. A true cache hit occurs when a microprocessor requests an item from the cache and the item is actually present in the cache. A cache miss occurs when the item is not present in the cache. A memory access request is also referred to as a CPU request or a lookup request.

The cache 200 is implemented using single-ported memories, meaning that only one access request can occur within the tag array 210 and/or data array 215 within a given clock cycle. However, multiple access requests can be received by the cache 200 and be simultaneously pending and/or in the pipeline. Example access requests are indicated by reference numeral 220 and can include a CPU request (a lookup request), a fill, and a snoop. A CPU request is generated when a CPU/microprocessor needs data and the CPU makes a request to the cache 200. To process this type of request, the tag array 210 would be checked to see if the data is present in the data array 215. If the data is not present, then a fill request can be sent to a higher level in the cache structure to retrieve the missing data and write the retrieved data to the data array 215 over a fill line.

A snoop request can be performed at various times when data stored in the cache becomes outdated and may need to be removed from the cache. The snoop request can include two separate operations, an inquiry operation and an invalidate operation. For a selected data that is outdated, the snoop inquiry reads the tag memory array 210 to determine if the outdated data is present, which is always performed when a snoop inquiry is received by the cache. If the outdated data is present, the invalidate operation would write into the tag memory array 210 to indicate that the data is invalid. The invalidate operation is performed only if the snoop inquiry "hits" in the cache.

During the performance of the snoop request, the inquiry operation may read all of the tag entries within a "set" determined by the snoop's address in the tag array 210 to determine which "way," if any, currently contains data for a given address that is outdated. The invalidate operation can then change the tag for that particular cache entry to mark it with a "not valid" state. Example cache states will be described with reference to FIGS. 8 and 9. In typical cache designs, the invalidate operation is performed a small fraction of the time. Thus, most snoop requests will require only a single access to the tag memory array 210. Knowledge of access requirements for the different types of cache events becomes helpful when assigning the stages of the pipeline to the cache events. As will be described below, the stage assignments can control the order of processing and help to reduce and/or avoid access conflicts between the cache events that are attempting to access the cache.

With further reference to FIG. 2, the cache control logic 205 is configured to control processing of the cache events/access requests 220 that are processed through the single-ported memories of the cache 200. The cache control logic 205 can include a selection logic like multiplexer 225 that can select one or more of the access requests 220 to process. A pipeline logic 230 can implement a multi-stage pipeline to control a sequence of operations 235 associated with the access requests 220. The pipeline logic 230 can define a set of stages that identify a processing order for each type of access request so that, based on a current stage, the cache control logic 205 can determine what actions can be performed. The sequence of operations 235 are assigned to the stages so that access requests to the tag array 210 and/or the data array 215 occur in different stages of the pipeline.

For example, a lookup request and a snoop inquiry both perform a read access to the tag array 210. The sequence of operations 235 defined for the lookup request and for the snoop inquiry can be assigned to the pipeline so that the read access to the tag array 210 occurs in different stages of the pipeline for the two types of operations. As such, when processing both the lookup request and the snoop inquiry simultaneously based on the pipeline stages, the access request to the tag array will occur at different times (e.g. different clock cycles), thereby avoiding an access conflict. Similar assignments to stages can also be made for other operations and other access requests in order to avoid or minimize access conflicts. A more detailed example of the multi-stage pipeline and the pre-assigned sequence of operations will be described with reference to FIGS. 3–7.

In another example, the cache 200 can include buffering logic (not shown) that is operably connected to the multiplexer 225. Since a microprocessor can send an access request 220 every clock cycle and that the CPU Request line may have multiple lines (e.g. 8 lines for multiple data requests), the buffering logic can be used to queue the multiple requests until they are selected for processing through the multiplexer 225. Based on a 4-cycle pipeline example described below, a new CPU request can be started every 4 cycles thus allowing a CPU request to be selected from the buffering logic every 4 clock cycles.

With further reference to FIG. 2, one example of a pipeline structure that can be configured with the cache control logic 205 is a 4-stage pipeline. The example will be based on one stage being performed during one clock cycle. Thus, the pipeline will also be referred to as a 4-cycle pipeline. It will be appreciated that a pipeline can be implemented with a greater or lesser amount of stages.

In an example configuration, the number of stages can be based on a size ratio between data buses of the cache to a full width cache line. For example, if a full width cache line is 1,024 bits of data, it may be undesirable to have full width data buses between various levels of cache memories. One option is to sub-divide the transmission of data into smaller sizes so that smaller buses, such as data buses 240 and 245, can be used. Multiplexers can be used with the data buses 240 and 245 to provide expansion of the data bus widths going into and out of the data array 215. If the data buses are made to be one quarter (¼) of the full cache line, the data buses would be 256 bits wide. This means that it would take four clock cycles to perform a data transfer for one cache line. Since it takes four cycles to perform a data transfer, the multi-stage pipeline can be configured with four stages corresponding to the four cycles. It will be appreciated that a different number of cycles and a different number of stages can be implemented based on this example including a dual multi-stage pipeline as will be described in later examples.

Using the example 4-stage pipeline structure, the system 200 will have four clock cycles in which to perform various operations associated for a given access request. As previously described, each access request or cache event, includes a sequence of operations that are performed to complete the request. The sequence of operations can be assigned to selected stages within the pipeline (e.g. based on an assigned starting stage) that allow the cache control logic 205 to have a CPU request, a fill, and a snoop inquiry all in the pipeline at the same time and have each access request accessing the tag array 210 and/or data array 215 at different times within the pipeline. In this manner, conflicts between access requests can be avoided or at least minimized.

With reference to FIG. 3–7, various examples of pipeline timing diagrams are illustrated. In the figures, an example pipeline structure implements a dual 4-stage pipeline that includes a primary pipeline having four stages and a secondary pipeline having four stages. As previously explained, the 4-stage pipeline is based on a design where the data buses are ¼ of a full width cache line. The timing diagrams represent an example processing order that can be used when processing cache events.

A state machine (not shown) can be configured to control the stages of the pipeline 230. For example, the state machine can be in only one stage of the primary pipeline at any given time. The state machine can also be in only one stage of the secondary pipeline at a given time. However, if both the primary and secondary pipelines are active, they will be in corresponding stages at the same time. For example, they may both be in their second stage, but one pipeline cannot be in its second stage while the other is in its third stage. Thus, if the cache 200 is performing a cache operation when a new operation arrives, the new operation may need to wait one or more cycles to properly align with the current stage and enter the primary pipeline. If the cache 200 is idle when a new operation arrives, the new operation can start and enter the primary pipeline immediately.

Figure 3:
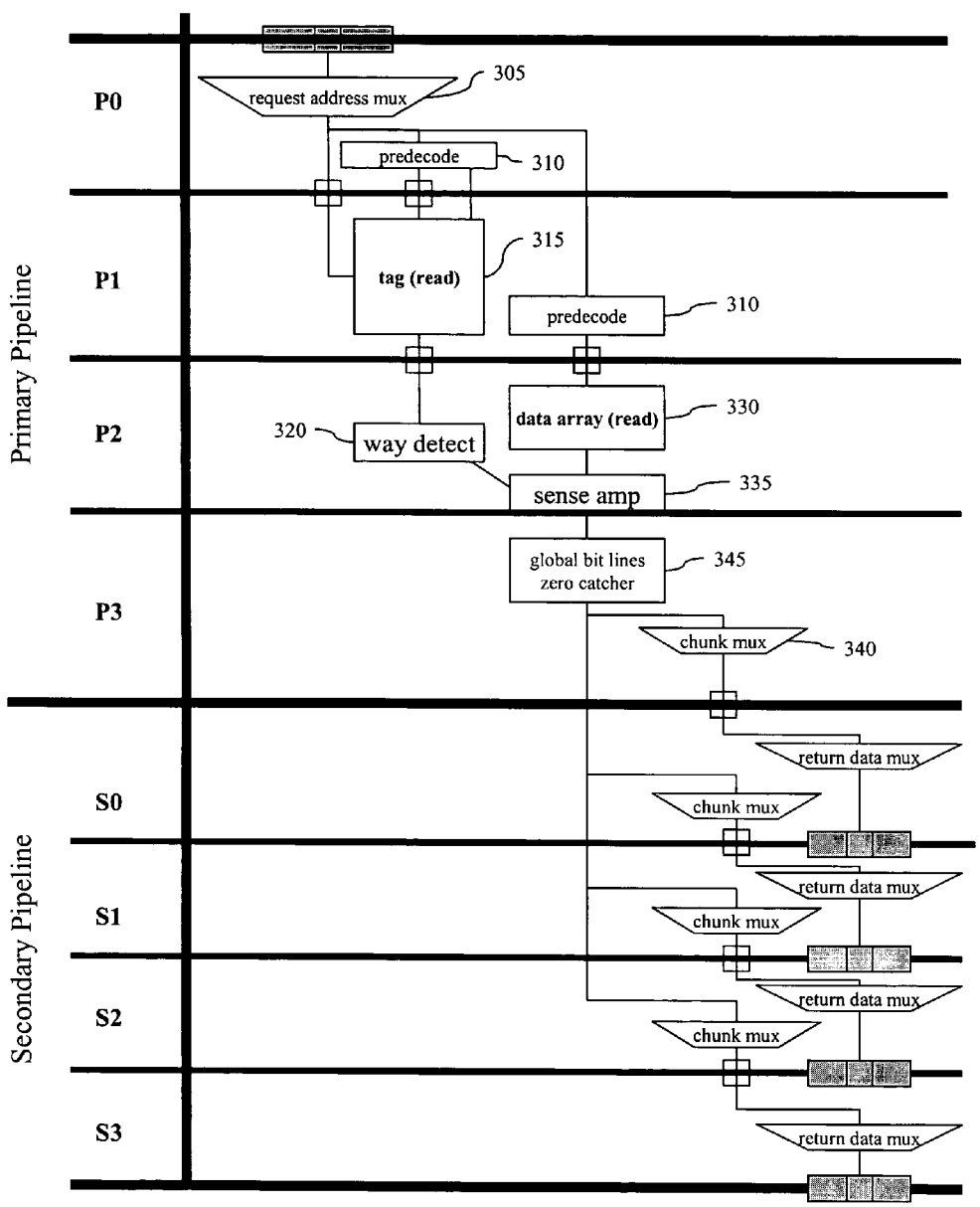
FIG. 3 illustrates an example timing diagram for a lookup request that results in a hit.
Figure 4:
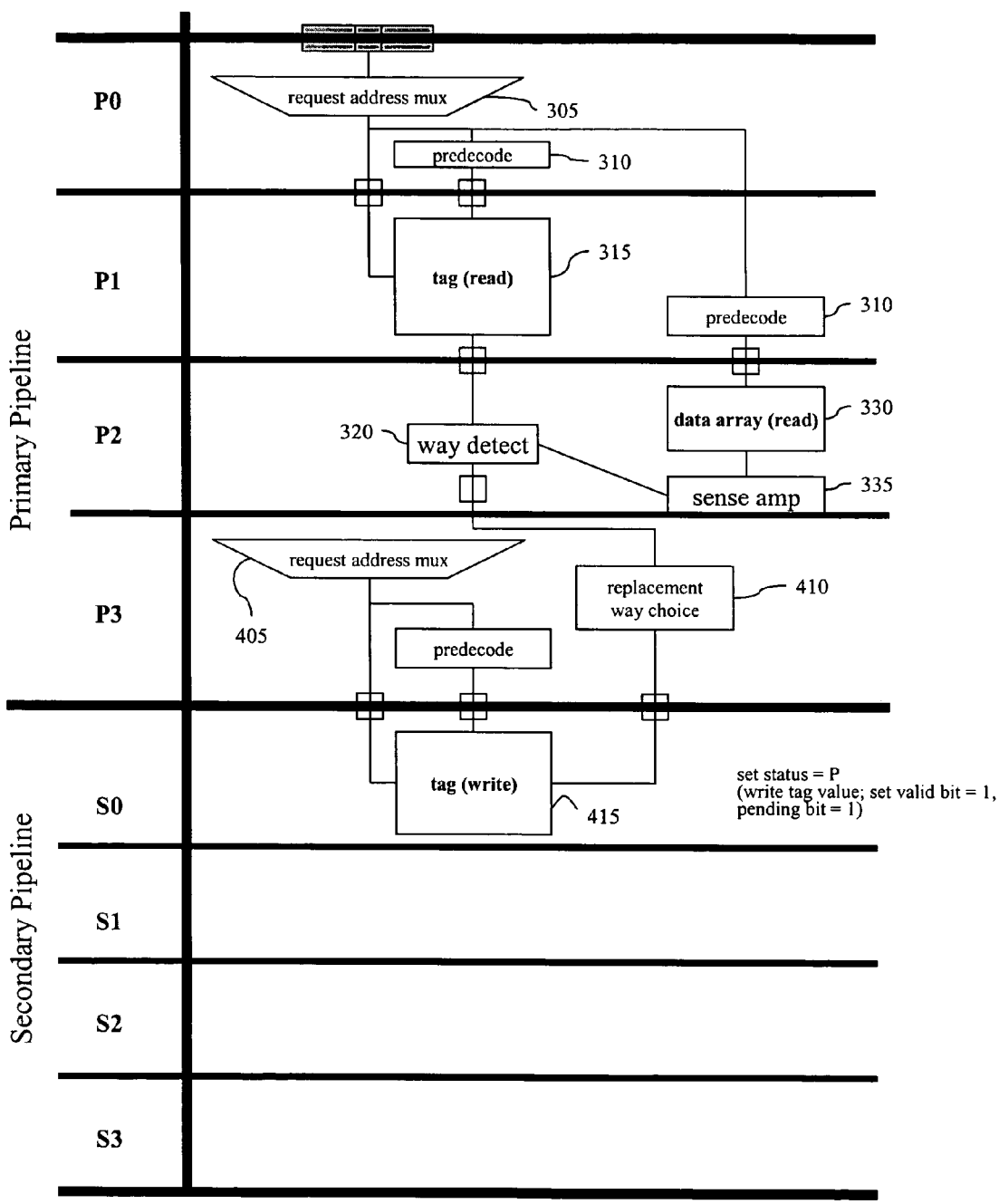
FIG. 4 illustrates an example timing diagram for a lookup request that results in a miss.
Figure 5:
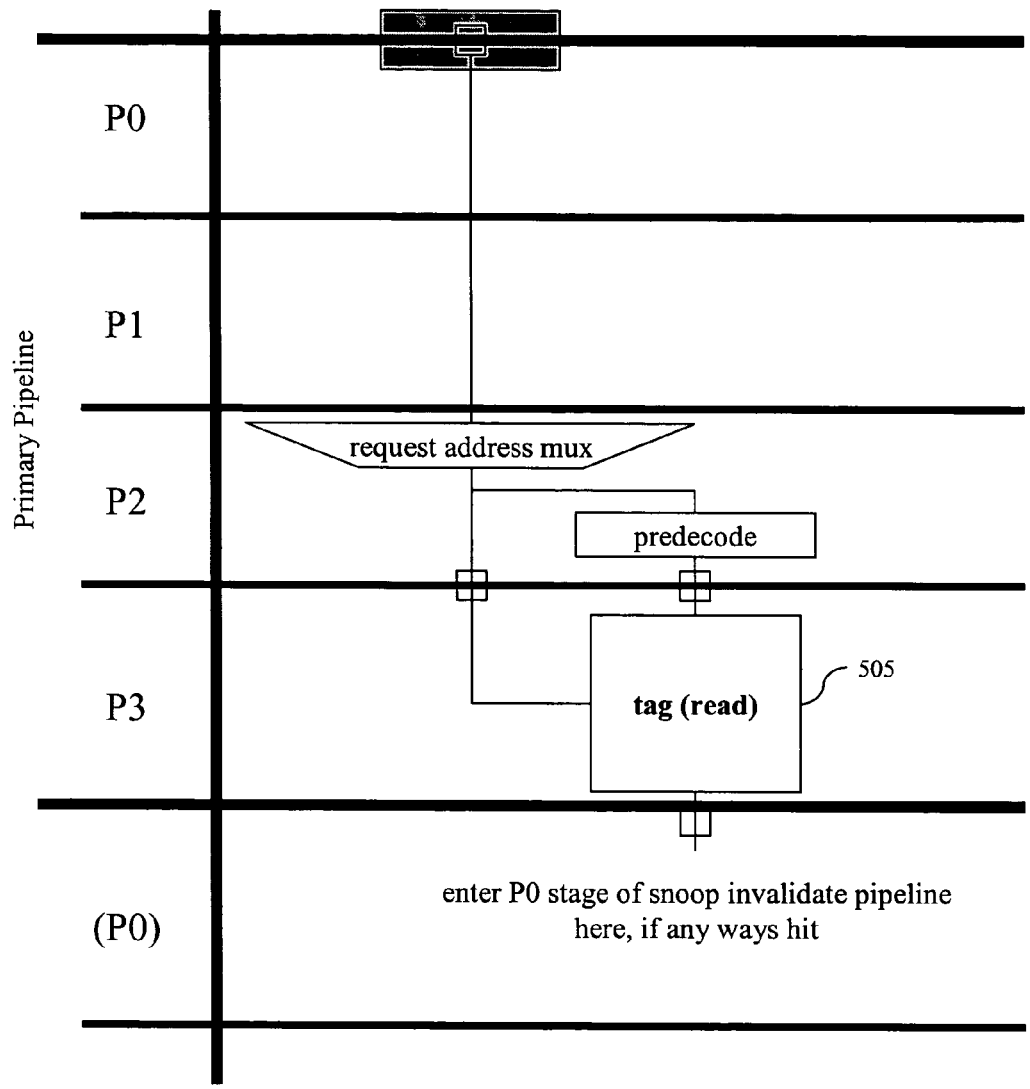
FIG. 5 illustrates an example timing diagram for a snoop inquiry.
Figure 6:
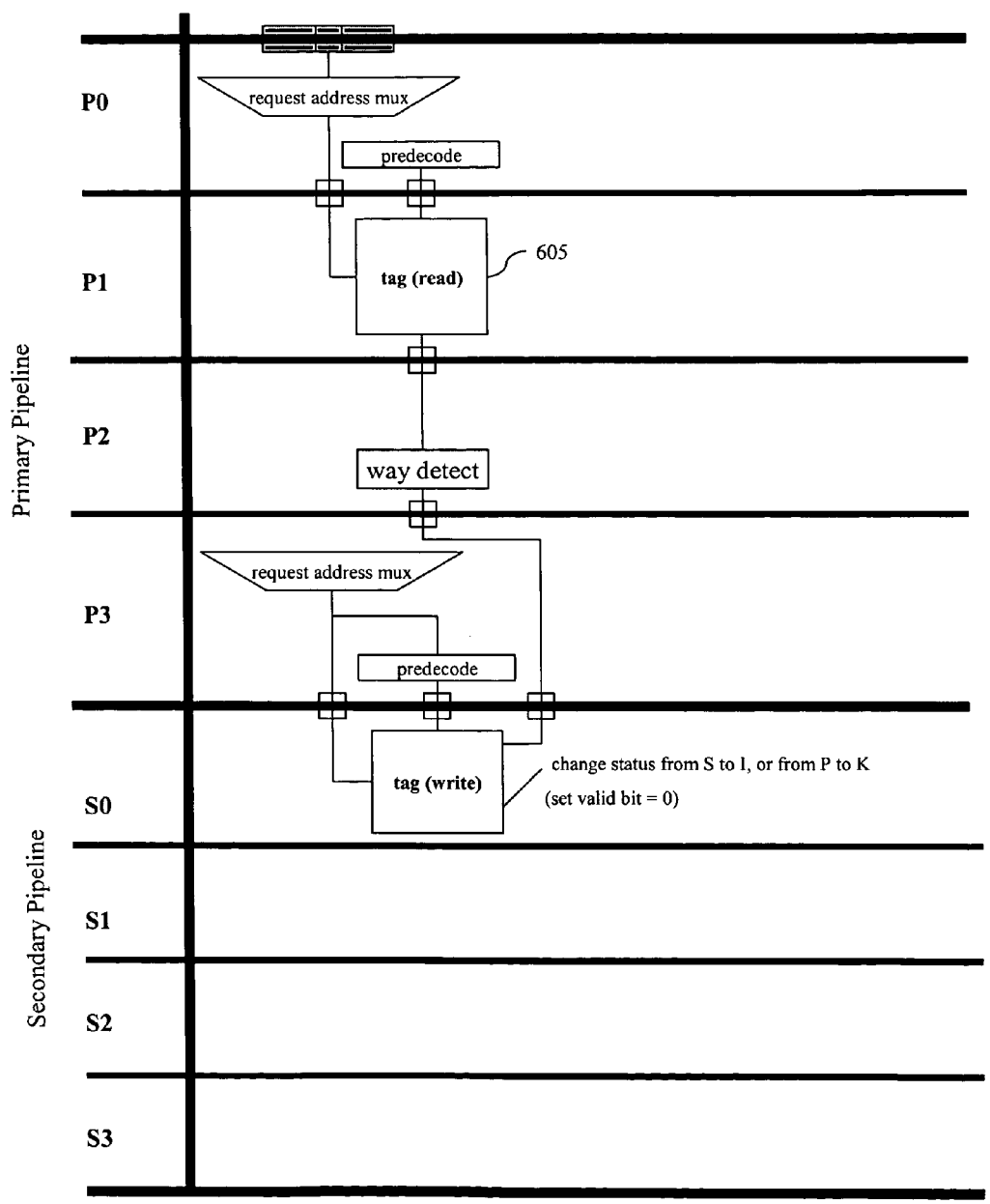
FIG. 6 illustrates an example timing diagram for a snoop invalidate operation.
Figure 7:
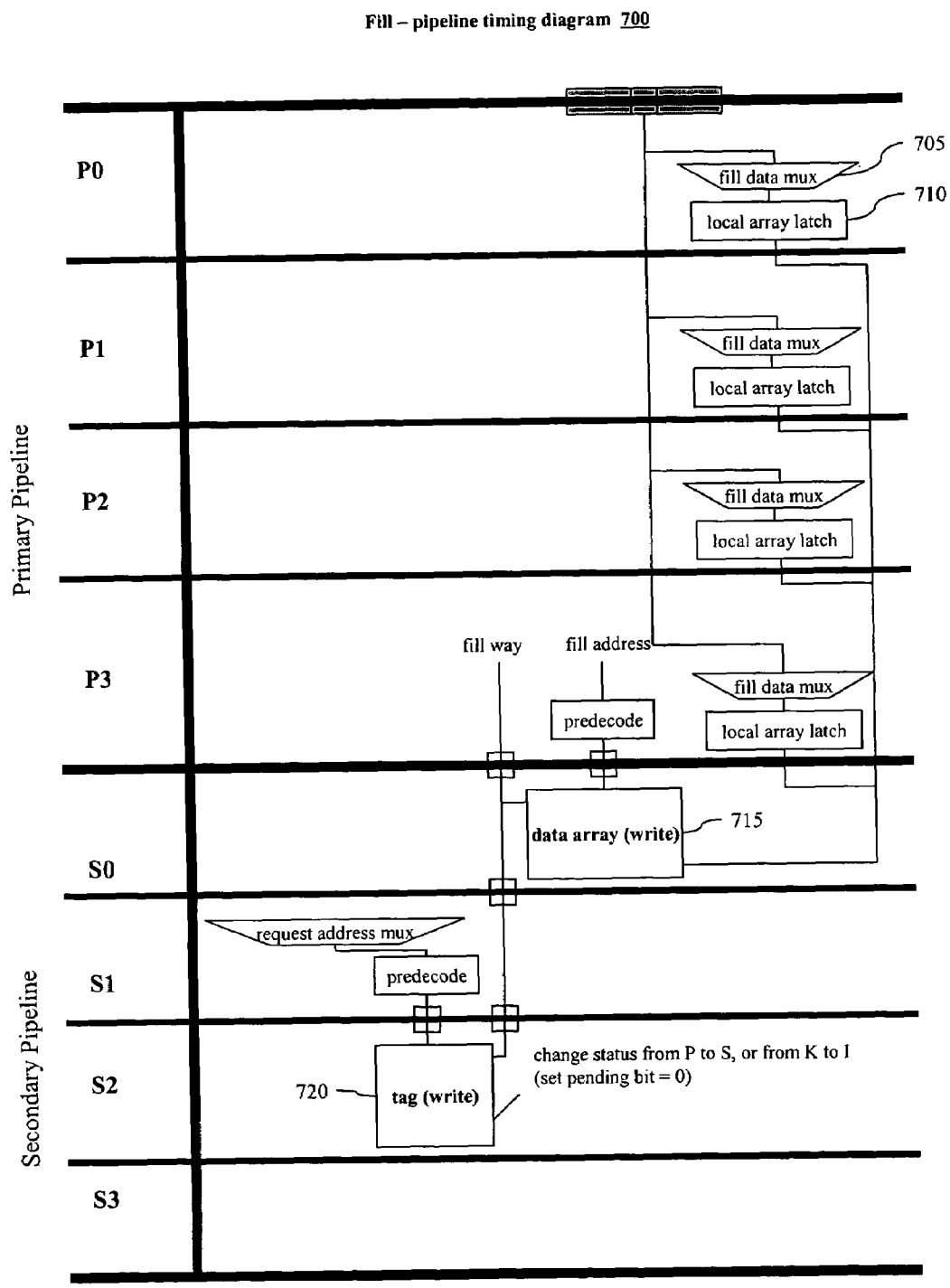
FIG. 7 illustrates an example timing diagram for a fill request.

Each of the FIGS. 3–7 illustrate an example sequence of operations for a selected cache event and an example assignment of those operations to selected stages in the pipeline. For example, FIG. 3 illustrates an example pipeline timing diagram 300 for a lookup request that results in a "hit." FIG. 4 illustrates an example pipeline timing diagram 400 for a lookup request that results in a "miss." FIG. 5 illustrates an example pipeline timing diagram 500 that can be associated with a snoop inquiry. FIG. 6 illustrates an example pipeline timing diagram 600 that can be associated with a snoop invalidate operation. FIG. 7 illustrates an example pipeline timing diagram 700 that can be associated with a fill request. It will be appreciated that depending on the implementation of a desired cache system, the operations associated with a selected cache event may differ from the example operations illustrated. The system is not intended to be limited by the illustrated operations or stage assignments.

When designing circuitry or other logic for a cache and its control logic, one example consideration may be as follows. For a fill request or lookup request, the cache system will use four clock cycles to assemble data before or after the data array is accessed once. Thus, the primary 4-cycle pipeline can be designed from this consideration. For example, with reference to the lookup request (hit) timing diagram of FIG. 3, the tags are read in the primary pipeline stage P1 at block 315, the data array is read in primary pipeline stage P2 at block 330, and then it takes four clock cycles (stages) to send the data out to the requesting device (e.g., L0 cache). The four stages used to send the data are shown in the secondary pipeline stages S0–S3. As will be described in greater detail below, the operations for different access requests are assigned to the various stages of the pipeline so that accesses to the tag array and/or the data array do not overlap and thus do not conflict with one another, or at least if a potential conflict exists, the conflict can be designed to occur infrequently.

The terminology of the primary and secondary pipeline stages is based on the 4-cycle design explained previously. In this design, the system can start a new access to the cache every four clock cycles. Thus, one way to view the pipeline structure is being a 4-stage pipeline that lasts for two groups of four cycles. In other words, this means that the system (e.g. cache control logic 105, 205) can start a new primary pipeline that overlaps with the secondary pipeline. As illustrated in the examples of FIGS. 3–7, each stage P0–P3 and S0–S3 represent different stages where each stage lasts for one clock cycle. The primary stages P0–P3, as well as the secondary stages S0–S3, represent sequential stages that would occur in order over four clock cycles.

With reference to the timing diagrams of FIGS. 3–7, it can be seen that the example assignments of pipeline stages to the operations of each access request can create a processing order for each access request that avoids and/or minimizes access conflicts. For example, by overlaying one or more timing diagrams, the read and write accesses for each request occur in different stages and thus, do not conflict with each other. For example, by comparing the lookup request "hit" diagram shown in FIG. 3, with the snoop inquiry shown in FIG. 5, and assuming that both requests are being processed simultaneously, then for the lookup request, the tags are being read in primary stage P1 (block 315) and, for the snoop request, the tags are being read in primary stage P3 (block 505). Also, by overlaying the timing diagram of the fill request shown in FIG. 7, and remembering that the secondary pipeline can overlap the primary pipeline, the fill request performs a tag write in secondary stage S2 (which would overlap primary stage P2) and does not conflict with the tag read for the lookup "hit" diagram or the fill request diagram.

Thus, using the example assignments of operations to the pipeline stages, a full utilization of the tag array can be achieved in the different stage cycles allowing possible combinations of a lookup request (either hit or miss), a fill request, and a snoop inquiry to occur simultaneously since they are accessing the tags at different stages. Thus, with a selected pre-assigned sequence of operations, the 4-cycle pipeline allows lookup requests, fill requests and snoop inquiries to occur simultaneously and the pipeline is used to ensure that each request is accessing the tag arrays and/or the data arrays of the instruction cache during unique cycles that do not conflict with each other. Of course, it will be appreciated that some assignment patterns may result in a potential conflict.

For example, based on the example stage assignments shown in FIGS. 3–7, the snoop invalidate diagram 600 shown in FIG. 6 includes a stage assignment where a tag read (block 605) occurs in primary stage P1. This may conflict with the tag read (block 315) of the lookup request shown in FIG. 3, which is also assigned to primary stage P1. If both of these requests were to be received concurrently, the processing of one request would need to be blocked or delayed because they would attempt to use the same resource (e.g., the tag array) at the same cycle (e.g., stage P1). If the cache control logic is configured to delay the lookup request in this situation, the lookup request will be delayed for only four clock cycles until the pipeline cycles through its stages. In this time period, the snoop invalidate would be processed and the pipeline would return to stage P0, which is the starting stage for the lookup request. This type of conflict can be acceptable in some designs since snoop invalidate operations are a rare event and the conflict will occur infrequently. Thus, the stage assignments can be made to optimize the processing of requests based on common occurrences of operations. As a result, potential conflicts can be minimized.

With reference again to FIG. 3, the following is a description of the example operations performed for a lookup request that results in a cache "hit." In the example stage assignments, the lookup request is assigned to begin processing in stage P0. This means that a pending lookup request will only begin processing when the pipeline is in stage P0. In operation, if the current pipeline stage is P2 and a lookup request is received or is pending to be processed, the lookup request would wait until the pipeline stages cycled around to stage P0. The processing control of the cache is configured in the cache control logic as previously described (e.g. cache control logic 105, 205). Since the pipeline in this example is configured with four stages, a lookup request may be delayed for at most three clock cycles.

Once the lookup request is initiated in stage P0, the operations performed in stage P0 may include a "request address mux" 305 and a pre-decode 310. The "request address mux" 305 refers to the address request being received by a multiplexer that is positioned before the tag array of the instruction cache. An example multiplexer is shown in FIG. 2 as MUX 220. The pre-decode operation 310 includes taking the address requested, which may be a multi-bit address, and translating the address into possible entries into the tag array. For example, 10 bits of a binary address may be used to select one of 1024 sets in the tag array. One way to physically implement the pre-decode operation is to have a separate word line for each tag entry and to translate the 10-bit addresses into the 1024 word lines. Of course, different sizes of addresses and tag array entries can be used.

In stage P1, a tag read operation 315 is performed. Here, an access to the tag array occurs. Since the cache is configured with a single-ported memory, only one access to the tag array can occur per stage. Using this as one condition, the sequence of operations for the other cache events can be assigned to the stages to minimize access conflicts as described previously.

Various actions can occur while processing a tag array access depending on the configuration of the cache. For example, word lines can be decoded, which can be performed along with the pre-decode operation 310 from stage P0. After the word lines are decoded, one word line is selected to be active and the line identifies, for the requested address, which entries in the tag array to read. One or more sense amplifiers (not shown) can be used for reading the data from the tag array. A sense amplifier is a physical circuit that amplifies the small signals that are driven out of each memory cell of the tag array and amplifies the signals to a higher, more usable value. A match operation can then be performed by using the information read from the tag entries to determine if the requested address was actually found in the data arrays of the cache.

In one example configuration, the cache can be configured with multiple "ways" of association, for example, eight ways. This means that any particular piece of data that is being requested from the cache can be located in any of the eight locations comprising a particular set in the cache. When the tag memory is read, only the locations within one particular set need to be accessed and checked for possible address matches. If the cache is configured with 8192 storage locations but any particular address can only be located in one of eight locations, then address matching is simplified for the cache. This is performed with the way detect operation 320. If the data is present in the data array, the data array is accessed 330 and the data is read. A sense amplifier 335 can again be used to amplify the signals read from the data array.

In this example, the primary pipeline stages P1 and P2 can be used for propagation time since the large amount of data coming from the data arrays requires additional time. Then secondary pipeline stages S0–S3 can be used for actually delivering the data to the requesting device (e.g., the microprocessor). As was previously explained, the 4-stage pipeline is associated with having a data bus that is ¼ of the size of a full cache line. Thus, data that is transferred to or from the cache will be divided into four equal size packets or chunks and it takes four clock cycles to disassemble 1,024-bits of data into four 256-bit chunks of data. A chunk MUX 340 can be a multiplexer configured to select and control the processing of chunks of data. The output signals from the sense amp 335 represent the data read from the data array and are placed on global bit lines 345. A zero catcher can be used to store the data for an extended time in the clock cycle before the data is split into four pieces by the chunk MUX 340.

With reference to FIG. 4, an example pipeline timing diagram 400 for a lookup request is illustrated where the request results in a "miss." The example operations for the lookup request are the same for primary pipeline stages P0–P2 as shown in the lookup request of FIG. 3. However in pipeline stage P3, since there was a "miss," the data arrays are not read. Instead, the process goes through the request address MUX again at 405 in stage P3 in order to access the tag array again. A replacement way choice 410 refers to an action performed on a third array in the cache memory.

In general, the "replacement way" attempts to place a chunk of data into one of the locations in the cache. As described previously, the cache can be configured with multiple locations such as eight "ways." When the cache needs to bring in a new piece of data, some data needs to be removed from the cache. The replacement way 410 attempts to determine what is the least costly piece of data to remove from the cache. One factor that can be considered is selecting the least recently used data. Of course, other types of factors may be used. At this point, a location is reserved for the new data for when it is received. The address of the new data can then be written into the tag array once the address is known.

Overall, the assignment of stages for the timing diagram of FIG. 4 shows that the tag array is accessed in stages P1 and in secondary stage S0. As described previously, the secondary pipeline can be regarded as overlapping with the primary pipeline stages thus the secondary stage S0 is equivalent to primary stage P0. Thus, for this lookup request, two stages have been assigned from the 4-stage pipeline.

With reference to FIGS. 5 and 6, the pipeline stage assignments and timing diagrams of a snoop inquiry 500 and a snoop invalidate operation 600 are illustrated, respectively.

The example operations of the snoop inquiry in FIG. 5 can be performed in a situation where a device or other source has indicated to the cache system that if the cache contains a particular piece of data, the cache should remove it because the data is outdated or otherwise no longer valid. During the snoop inquiry operation, the operation is configured to determine whether a selected piece of data is in the cache. Any time the cache system receives a snoop request, the inquiry operation is performed. Only if the requested data is actually in the cache is the snoop invalidate operation of FIG. 6 performed. As previously mentioned, the snoop invalidate operation is typically performed only a very small percentage of the time in relation to a snoop inquiry operation.

For the snoop inquiry, a tag read is performed at block 505. The example stage assignment shows that the tag read 505 occurs in primary pipeline stage P3. Considering the stage assignments associated with the lookup request and the snoop inquiry, a simultaneous lookup request and snoop inquiry will access the tag array in stages P0, P1, and P3. Thus, no access conflicts exist between the operations of these access requests.

However, with the example stage assignments, one potential conflict can occur. If the snoop inquiry results in a hit, then the snoop invalidate operation shown in FIG. 6 is performed. The example timing diagram 600 of the snoop invalidate shows that it has been assigned to begin processing in stage P0. A tag read 605 occurs in stage P1, which is the same stage that a tag read occurs for a lookup request (e.g., see FIGS. 3 and 4). Thus, one situation can occur where a conflict may arise if the snoop invalidate and the lookup request are being processed simultaneously. The cache control logic would be configured to block one of the operations and delay it until the next time its starting stage becomes current in the pipeline. In one configuration, the lookup request can be delayed to allow the snoop invalidate to process first. As previously mentioned, the snoop invalidate operation is a very infrequent event, thus, the example stage assignments shown are optimized in order to minimize potential access conflicts. Since this type of conflict may occur only on an infrequent basis, the throughput of the cache system is affected only minimally.

Illustrated in FIG. 7 is an example pipeline timing diagram 700 that can be associated with a fill operation. Remembering that the data bus in these examples is configured to be a 256-bit bus, which is ¼ of the full cache line, the cache will use four clock cycles to assemble four 256-bit chunks of data until the entire cache line is assembled. Once assembled, the data can then be written into the data arrays. The data assembly operations are represented by the fill data MUX (block 705) and local array latch (Block 710), which are repeated four times over pipeline stages P0–P3. Once all of the data is assembled, it can then be written into the data array (block 715) and this is shown to occur in secondary pipeline stage S0. In secondary stage S2, the address of the data is written into the tag array (block 720). Again considering the stage assignments, a simultaneous lookup request miss, snoop inquiry, and fill will access the tag array in stages 0, 1, 2, and 3 without any access conflicts.

It will be appreciated that the stage assignments for the example operations shown in FIGS. 3–7 are only one example configuration that can be used to process cache events using a multi-stage pipeline. The present systems and methods are not intended to be limited by the illustrated operations or the sequence of operations. It will be further appreciated that different cache system designs may be configured to process events and data in different ways which may include operations not shown in the illustrated examples and/or a fewer number or greater number of operations.

Figures 8, 9:
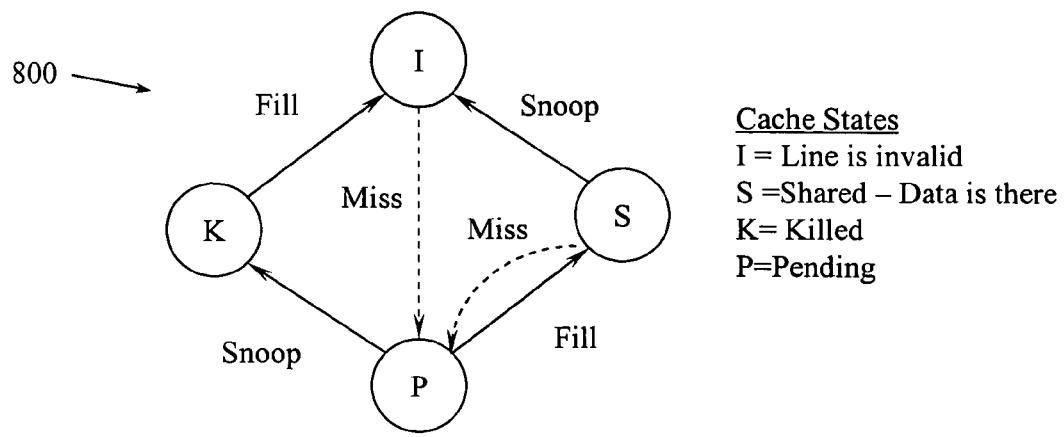
FIG. 8 illustrates an example cache state transition diagram.
FIG. 9 illustrates example bit encodings to represent cache states.

Illustrated in FIG. 8 is an example state diagram 800 that can be implemented with the cache system to control the states of the cache. Each tag entry can have a state. In one example, four possible cache states can be implemented for the cache system that include "I" that indicates the line is invalid, "S" indicating that the data is shared, "K" indicating that the data is killed, and "P" indicating that the data is pending. The example states are different than the general cache states called MESI states where "M" represents modified, "E" represents exclusive, "S" represents shared, and "I" represents invalid.

Since the example cache system is an instruction cache, it does not store modified data. In an instruction cache, there are no cache events or operations that will change its data that will lead to data being written to the memory. Based on this consideration, the cache system is configured with two states, invalid and shared, meaning that the data is consistent with the data in main memory. In order to support other operations, additional states can be used. For example, to support a lookup miss, when the system is allocating a new entry in the cache for data that is not yet received, the pending state "P" can be used.

The general flow in the cache line states shown in FIG. 8 can start in the invalid state "I" for a cache line. If a "lookup miss" occurs and the system sends a request for the data out to the L2 cache or memory, the state goes to a pending state "P". Only an entry in either the invalid or the shared state can be "replaced" and set to the pending state by a lookup miss. When the data for that entry is returned and the cache receives a fill, then the associated cache line transitions to the shared state "S". If a snoop is received that invalidates that line, then that line is returned to the invalid state "I". The killed state "K" can be configured to occur when a cache line is in a pending state "P" and a snoop is received before a fill request is received. In other words, the microprocessor has requested a line of data and the cache has sent a request out to the next level of memory (e.g., L2 cache) but then the cache receives a snoop that instructs the cache to cancel that line. Thus, the line is no longer valid. The killed state "K" is a way for the cache system to keep track of that situation. Subsequently, when a fill is received for a killed cache line, the state is changed to invalid "I" rather than the shared state "S". This is one way to ensure that the cache does not use a line of data after the data has been snooped out.

One example system for implementing the cache states can be by using two bits, a valid bit and a pending bit. Each tag entry in the tag array would have a valid bit and a pending bit associated to it for identifying its current state. A table illustrated in FIG. 9 shows example bit encodings 900 of the valid bit and pending bit to each of the four cache states. By implementing the bit encodings 900 to be used by the cache control logic, one access to the tag array may be avoided under certain conditions. For example, in order to perform a "tag write" for a snoop invalidate or for a fill request, the cache control logic does not need to read out the contents of the tag array in order to determine how to modify the contents.

As an example, referring to the cache state transitions 800, when the cache receives a fill, a cache entry might need to transition from the pending state to the shared state, or from the killed state to the invalid state. In a typical approach, the cache control logic could read the old cache line state from the tag array, decide on the new state based on that result, and write the appropriate new state into the cache entry. However, the bit encodings 900 can allow the cache control logic to avoid reading the tag array because it can be determined that no matter which of the cache states a cache line is in, if a fill is received for that cache line, the cache control logic only needs to clear the pending bit for the cache line. Thus, a potential "read access" of the tags can be eliminated and only a write operation needs to be performed.

By eliminating a tag read for a snoop invalidate or a fill request, assigning the cache events to the stages is simplified and reduces potential access conflicts by reducing the number of tag accesses that need to be performed. In general, the cache states 800 and bit encodings 900 can be used to functionally identify what state each cache line is in and indicate what operations can be performed for each cache line.

Using the example stage assignments shown in FIGS. 3–7 and the example states of FIGS. 8 and 9, a few example design considerations for the cache system 200 can be as follows. A snoop inquiry can be performed once every eight clock cycles, in parallel with lookup and fill events. If a snoop invalidate is required, then it will take the place of a lookup request in the pipeline. FIG. 6 shows the snoop invalidate performing a second read of tag memory (to make its operations look similar to a lookup request), but the second tag read is not functionally needed, and could be eliminated to possibly further reduce access conflicts.

The cache system 200 can be configured to write a complete tag entry. The cache can also allow just the pending bit, or just the valid bit, in a tag entry to be individually written. This feature can allow both "fill" operations and "snoop invalidates" to perform a single write operation to the tags, rather than the two tag memory accesses that would otherwise be performed during a read/modify/write sequence.

The system can also be configured to set both the valid and the pending bits for the new tag entry when a "miss" occurs. For a "fill," the system can clear the appropriate tag entry's pending bit but not change the tag entry's valid bit. For a "snoop invalidate," the system can clear the appropriate tag entry's valid bit without changing the entry's pending bit. This also allows "fills" and "snoops" to overlap, without the possibility that the update for one operation will not observe the update for the other operation and put the entry into an erroneous state.

Figure 10:
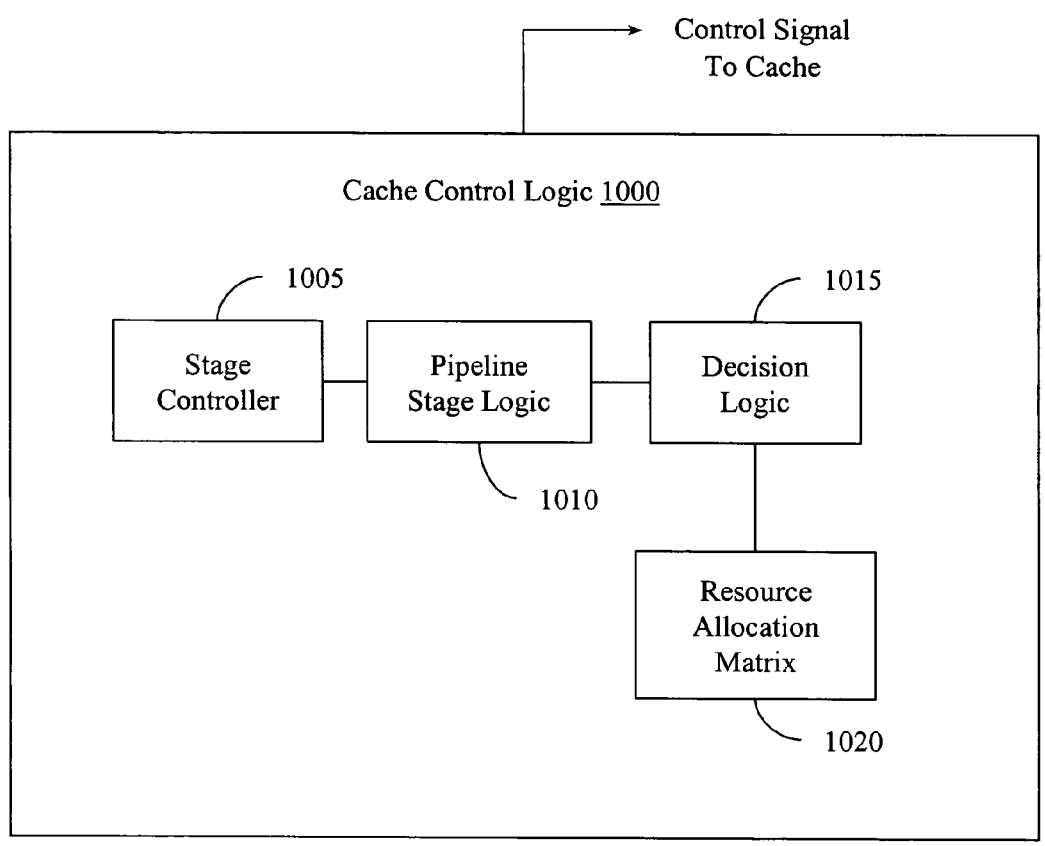
FIG. 10 illustrates another example cache control logic.

Illustrated in FIG. 10 is an example configuration of a cache control logic 1000 that can facilitate processing of cache events using a multi-stage pipeline. The cache control logic 1000 can be used to implement other example cache control logics 105 and 205 described previously. The cache control logic 1000 can include a stage controller 905 configured as logic that indicates when to start counting the pipeline stages. For example, if there are no pending requests in the cache (e.g. an idle state), then the pipeline stages do not need to advance. If a request is received and the pipeline is in an idle state, then the stages would begin at stage P0 and begin cycling based on the clock cycle.

A pipeline stage logic 1010 can be used to identify the current stage in the pipeline. In one example, the pipeline stage logic 1010 can be configured with a counting mechanism that can repetitively count and sequentially cycle through the stages. One configuration can be to have multiple flip-flops or registers that correspond to the number of stages implemented for the pipeline. If the cache control logic 1000 is configured with a dual 4-stage pipeline including a primary pipeline and secondary pipeline as described in previous examples, the total number of stages would be eight. As such, eight flip-flops can be configured to propagate a bit through the chain of flip-flops. The position of the bit would represent the current stage of the pipeline.

With further reference to FIG. 10, a decision logic 1015 can be configured to decide what actions and/or operations can be or need to be taken at each pipeline stage. The decision can be based on the current stage of the pipeline as indicated by the pipeline stage logic 1010 and a resource allocation matrix 1020. The resource allocation matrix 1020 can be configured as logic that defines the sequence of operations for each cache event and the corresponding pipeline stages in which each operation can be performed. In one example, the resource allocation matrix 1020 can define, using circuitry, the pipeline stage assignments shown in FIGS. 3–7 associated with various cache events.

The following example processing operation is based on the stage assignments shown in FIG. 3 for a lookup request. If a lookup request has been selected and is being processed, the decision logic 1015 can determine that if the pipeline is in primary stage P1, then the tag array should be read. This is seen in FIG. 3 where the tag read operation 315 is assigned to stage P1. Other example scenarios and decisions will be appreciated based on the foregoing example. Based on the processing decision made by the cache control logic 1000, one or more control signals can be generated to control the cache. For example, using the cache structure shown in FIG. 2, the cache control logic 205 can send control signals to the multiplexer 225, the tag array 210, and the data array 215.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks. While the figures illustrate various actions occurring in serial, it is to be appreciated that various actions could occur concurrently, substantially in parallel, and/or at substantially different points in time.

Figure 11:
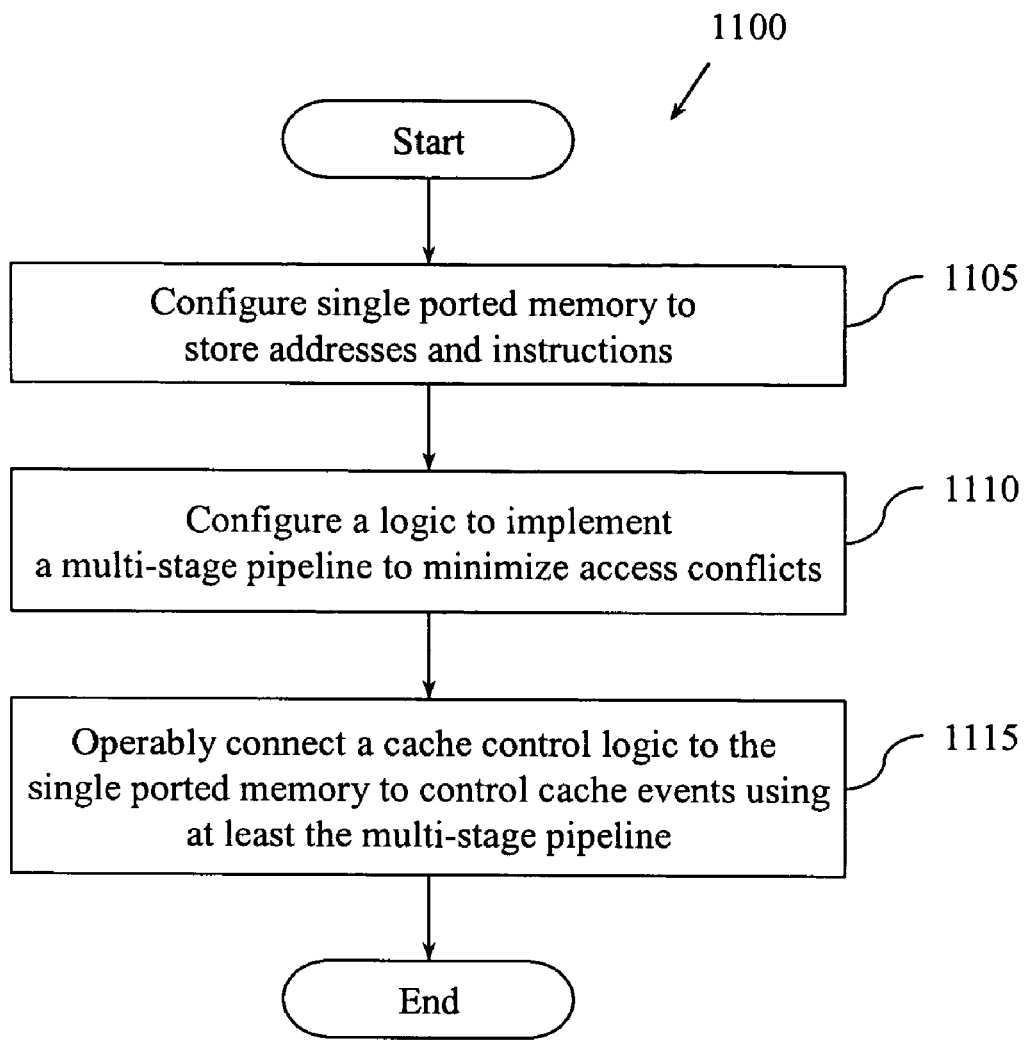
FIG. 11 illustrates an example methodology that can be associated with designing, configuring, and/or manufacturing a cache system.

Illustrated in FIG. 11 is an example methodology 1100 that can be associated with designing, configuring, and/or manufacturing a cache system. It can include constructing a microprocessor having a cache memory. The illustrated elements denote "processing blocks" that may be implemented in logic. In one example, the processing blocks may represent executable instructions that cause a computer, processor, and/or logic device to respond, to perform an action(s), to change states, and/or to make decisions. Thus, the described methodologies can be implemented as processor executable instructions and/or operations provided by a computer-readable medium. In another example, the processing blocks may represent functions and/or actions performed by functionally equivalent circuits such as an analog circuit, a digital circuit, an application specific integrated circuit (ASIC), or other logic device. The diagram of FIG. 11, as well as the other illustrated diagrams, are not intended to limit the implementation of the described examples. Rather, the diagrams illustrate functional information one skilled in the art could use to design/fabricate circuits, generate software/firmware, or use a combination of logics to perform the illustrated processing.

It will be appreciated that cache designs may involve dynamic and flexible processes such that the illustrated blocks can be performed in other sequences different than the one shown and/or blocks may be combined or separated into multiple components. Blocks may also be performed concurrently, substantially in parallel, and/or at substantially different points in time. The foregoing applies to all methodologies described herein.

With reference to FIG. 11, the example methodology 1100 includes configuring single-ported memory structures to store addresses and instructions in the cache (block 1105). Logic can be configured to implement a multi-stage pipeline where operations for performing a set of cache events are associated to stages in the multi-stage pipeline to minimize access conflicts to the single-ported memories (block 1110). A cache control logic can be operably connected to the single-ported memories (block 1115). The cache control logic can be configured to control processing of the set of cache events using at least the multi-stage pipeline to coordinate a sequence for processing the set of cache events. Example cache events include a lookup request, a fill request, and a snoop as previously described. However, it will be appreciated that other types of operations and cache events may be implemented based on different cache designs.

The configuring block 1110 can include selecting a number of stages that will comprise the multi-stage pipeline. Given a set of cache events that can function with the cache, each cache event includes a set of operations that are performed when the cache event is processed. The operations of each cache event are associated or otherwise assigned to the stages in the multi-stage pipeline, which defines a starting stage and processing order for each cache event. In this manner, access to the memory arrays of the cache are designated to occur during known stages. As such, the methodology 1100 can include configuring the cache control logic to statically allocate access to the single-ported memories based on the assigned stages. Statically allocating the resources of the cache simplifies the cache control logic and reduces the number of cache event timing combinations that need to be validated.

Figure 12:
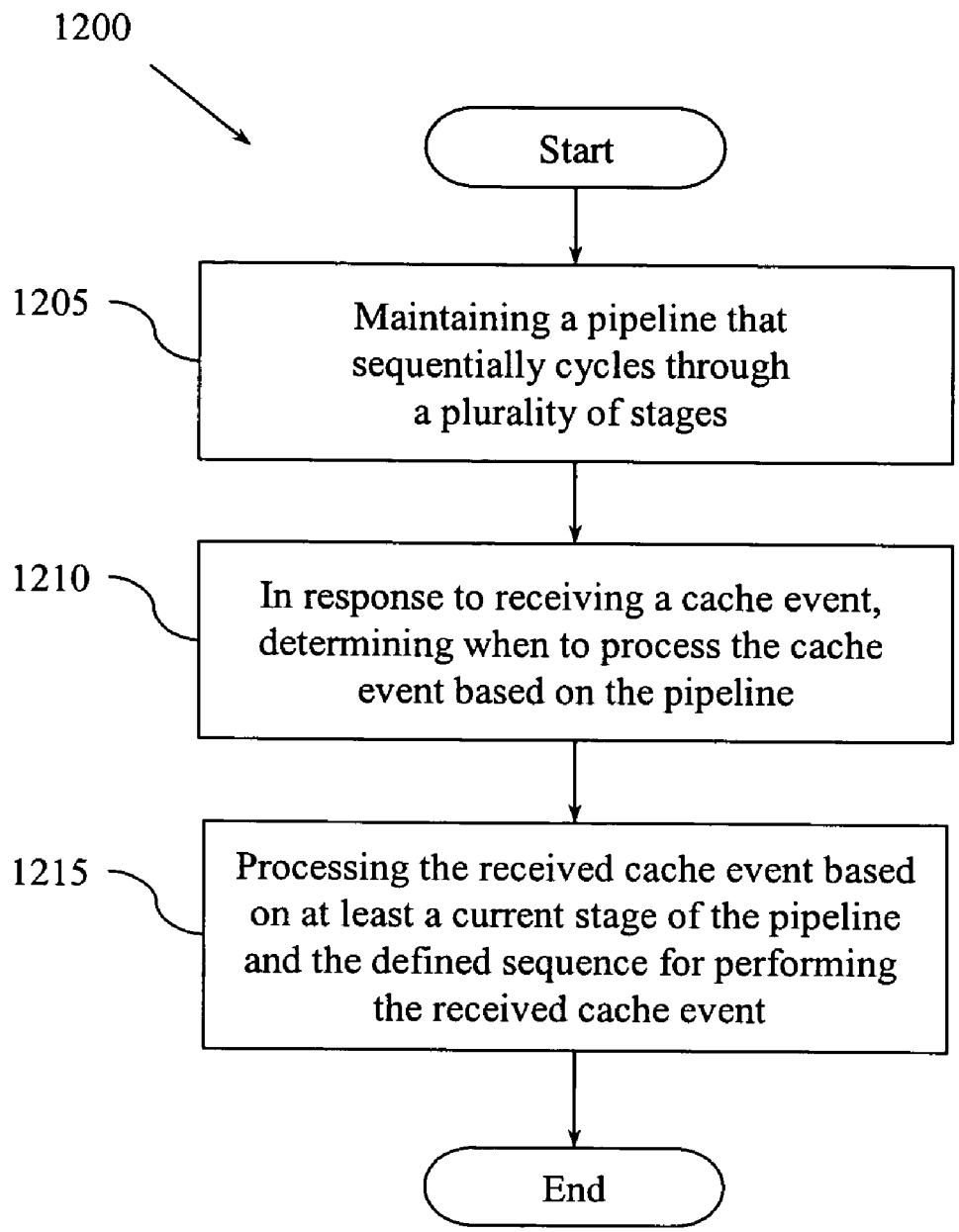
FIG. 12 illustrates an example methodology that can be associated with processing cache events using a multi-stage pipeline.

Illustrated in FIG. 12 is an example methodology 1200 that can be associated with processing cache events for single-ported cache memories. The methodology can include maintaining a pipeline that sequentially cycles through a plurality of stages (block 1205). The plurality of stages are configured to define a sequence for performing each of the cache events where the sequence minimizes access conflicts between the cache events. In response to receiving a cache event, the method can determine when to process the cache event based on the sequence defined by the pipeline (block 1210). The received cache event is then processed based on at least a current stage of the pipeline and the defined sequence for performing the received cache event (block 1215).

The pipeline can include a fixed number of stages and the current stage is sequentially cycled through the pipeline based on a clock cycle. When the cycle reaches the ending stage of the pipeline, the stages repeat. As described in previous examples, each cache event is assigned a starting stage in the pipeline, which identifies when the particular cache event can begin processing. If a cache event is received and the current stage is not the starting stage assigned to the received cache event, the processing of the received cache event is delayed until the pipeline returns to the starting stage of the event. In this manner, the resources of the cache can be statically allocated based on the stage assignments, and access conflicts can be minimized or avoided.

Figure 13:
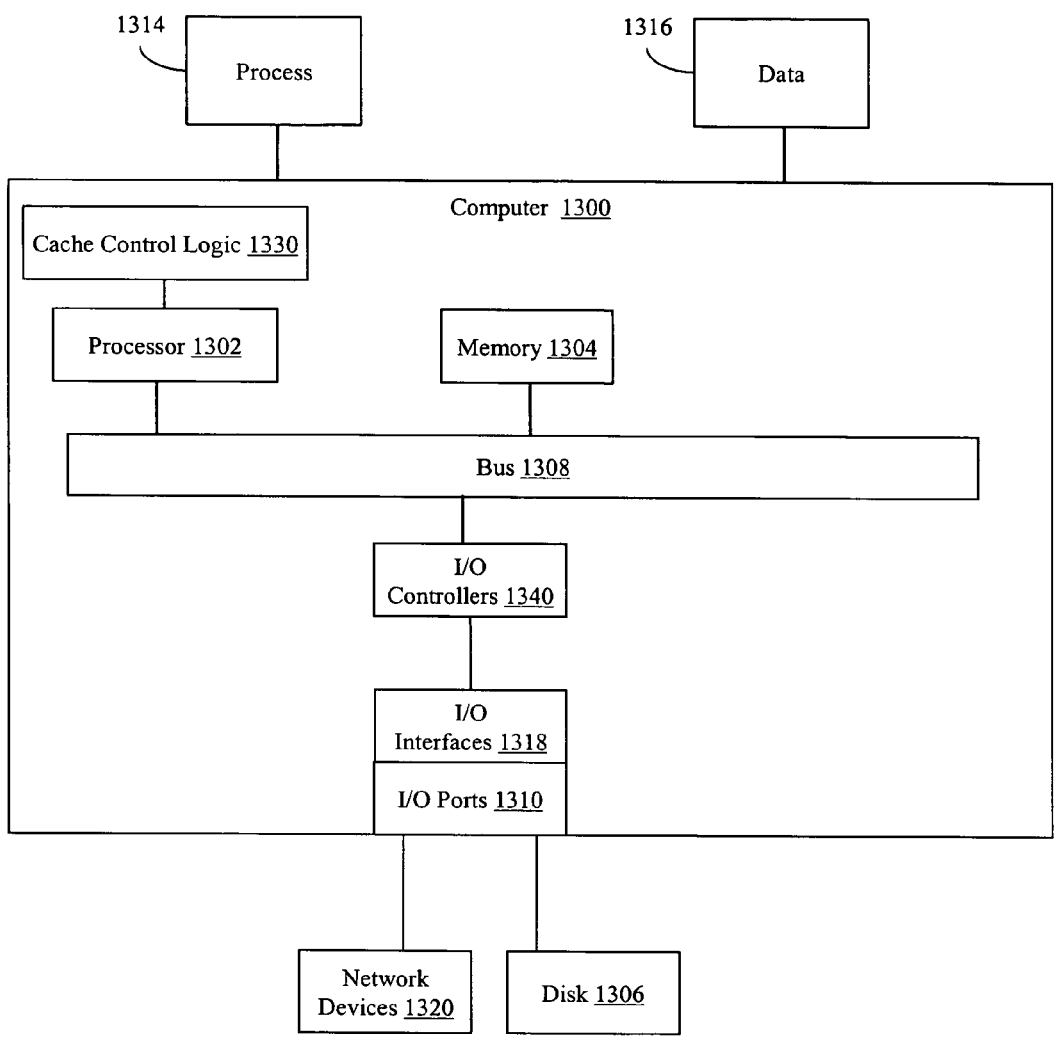
FIG. 13 illustrates an example computing environment in which example systems and methods illustrated herein can be implemented in and operate.

FIG. 13 illustrates an example computing device in which example systems and methods described herein, and equivalents, can operate. The example computing device may be a computer 1300 that includes a processor 1302, a memory 1304, and input/output ports 1310 operably connected by a bus 1308. In one example, the computer 1300 may include a cache control logic 1330 configured to facilitate processing cache events using a multi-stage pipeline. The cache control logic 1330 can be implemented similar to the cache control logics 105, 205, 1000 described in FIGS. 1, 2, and 10, as well as other systems and methods described herein.

Generally describing an example configuration of the computer 1300, the processor 1302 can be a variety of various processors including dual microprocessor and other multi-processor architectures. The memory 1304 can include volatile memory and/or non-volatile memory. The non-volatile memory can include, but is not limited to, ROM, PROM, EPROM, EEPROM, and the like. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 1306 may be operably connected to the computer 1300 via, for example, an input/output interface (e.g., card, device) 1318 and an input/output port 1310. The disk 1306 can include, but is not limited to, devices like a magnetic disk drive, a solid state disk drive, a floppy disk drive, a tape drive, a Zip drive, a flash memory card, and/or a memory stick. Furthermore, the disk 1306 can include optical drives like a CD-ROM, a CD recordable drive (CD-R drive), a CD rewriteable drive (CD-RW drive), and/or a digital video ROM drive (DVD ROM). The memory 1304 can store processes 1314 and/or data 1316, for example. The disk 1306 and/or memory 1304 can store an operating system that controls and allocates resources of the computer 1300.

The bus 1308 can be a single internal bus interconnect architecture and/or other bus or mesh architectures. While a single bus is illustrated, it is to be appreciated that computer 1300 may communicate with various devices, logics, and peripherals using other busses that are not illustrated (e.g., PCIE, SATA, Infiniband, 1394, USB, Ethernet). The bus 1308 can be of a variety of types including, but not limited to, a memory bus or memory controller, a peripheral bus or external bus, a crossbar switch, and/or a local bus. The local bus can be of varieties including, but not limited to, an industrial standard architecture (ISA) bus, a microchannel architecture (MSA) bus, an extended ISA (EISA) bus, a peripheral component interconnect (PCI) bus, a universal serial (USB) bus, and a small computer systems interface (SCSI) bus.

The computer 1300 may interact with input/output devices via i/o interfaces 1318 and input/output ports 1310. Input/output devices can include, but are not limited to, a keyboard, a microphone, a pointing and selection device, cameras, video cards, displays, disk 1306, network devices 1320, and the like. The input/output ports 1310 can include but are not limited to, serial ports, parallel ports, and USB ports.

The computer 1300 can operate in a network environment and thus may be connected to network devices 1320 via the i/o devices 1318, and/or the i/o ports 1310. Through the network devices 1320, the computer 1300 may interact with a network. Through the network, the computer 1300 may be logically connected to remote computers. The networks with which the computer 1300 may interact include, but are not limited to, a local area network (LAN), a wide area network (WAN), and other networks. The network devices 1320 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), and the like. Similarly, the network devices 1320 can connect to WAN technologies including, but not limited to, point to point links, circuit switching networks like integrated services digital networks (ISDN), packet switching networks, and digital subscriber lines (DSL).

It will be appreciated that the example cache systems described herein can be configured with cache lines that are direct mapped, fully associative, or set associative with respect to the memory addresses. A direct mapped cache associates a particular cache line with each memory address and places the instructions or data stored at a particular address only in that particular cache line. A fully associative cache does not associate a memory address with any particular cache line. Instructions and data can be placed in any cache line. A set associative cache directly maps sets or groups of consecutive cache lines to particular memory locations. However, within a set of cache lines, the cache can be fully associative.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. An instruction cache, comprising:
   single-ported memories;
   a cache control logic configured to process cache events of different types that may be received by the instruction cache, and being configured with a multi-stage pipeline that coordinates processing of the cache events to the single-ported memories; and
   the multi-stage pipeline having different stages pre-assigned as read/write stages for the cache events to minimize access conflicts between the cache events.

2. The instruction cache of claim 1 where the single-ported memories include:
   a data array configured to store instructions; and
   a tag array configured to store addresses to the instructions stored in the data array.

3. The instruction cache of claim 2 where instruction cache is a level one cache.

4. The instruction cache of claim 1 where the multi-stage pipeline is configured as a dual four stage structure where each stage is associated with one clock cycle.

5. The instruction cache of claim 4 where the pipeline includes a primary pipeline and a secondary pipeline where each pipeline includes four stages.

6. The instruction cache of claim 1 where the cache control logic includes a multiplexer configured to receive the different types of cache events as inputs and configured to select which of the inputs is processed based on a current stage of the multi-stage pipeline.

7. The instruction cache of claim 1 where the different types of cache events include a fill request, a CPU data request, and a snoop; and
   the cache control logic being configured to allow the different types of cache events to simultaneously be in the multi-stage pipeline and where an access to tag arrays of the instruction cache is assigned to occur in different stages in the multi-stage pipeline for each of the cache events.

8. The instruction cache of claim 7 where the multi-stage pipeline is configured to have pre-assigned stages that define a sequence of operations for each of the cache events to provide simultaneous processing of the cache events while minimizing access conflicts.

9. The instruction cache of claim 1 where the cache control logic includes a means for sequentially cycling through stages of the multi-stage pipeline and to indicate a current stage.

10. The instruction cache of claim 9 where the means for sequentially cycling includes a register configured to propagate a bit through locations in the register where a location of the bit indicates the current stage.

11. The instruction cache of claim 1 further including:
    a resource allocation matrix configured to define what type of cache events can be processed in the instruction cache at selected stages in the multi-stage pipeline to avoid access conflicts; and
    where the cache control logic includes a decision logic configured to determine which cache event can be processed based on the resource allocation matrix and based on conditions including: a current stage of the multi-stage pipeline and an access type being processed.

12. The instruction cache of claim 1 where the instruction cache is operably connected to a processor chip.

13. The instruction cache of claim 1 where the instruction cache includes at least one cache line and at least one data bus, where a full width of the cache line has a size that is N times the number of bits that the data bus can transfer in one clock cycle, and where a number of stages in the multi-stage pipeline is N.

14. The instruction cache of claim 13 where the multi-stage pipeline is defined with a primary pipeline and a secondary pipeline where both include N stages that is based on the line size of the instruction cache in relation to the data bus.

15. The instruction cache of claim 13 where N is four.

16. The instruction cache of claim 1 where cache control logic is configured to statically allocate read/write accesses to the single-ported memories based on the stages of the multi-stage pipeline.

17. A computing system, comprising:
   a microprocessor configured to process instructions;
   a single ported cache operably connected to the microprocessor and being configured to store instructions;
   a cache control logic operably connected to the cache and being configured to control cache events into the single ported cache based on a multi-stage pipeline; and
   the multi-stage pipeline including stages that define sequences for processing different types of cache events in different stages to minimize access conflicts between the different types of cache events in the single ported cache.

18. The computing system of claim 17 where the cache events include a read access and a write access.

19. The computing system of claim 17, the single-ported cache including multiple single-ported memories.

20. The computing system of claim 17 where the cache control logic is configured to statically allocate access to the single ported cache based on the stages of the multi-stage pipeline.

21. A method for constructing a microprocessor having a cache memory, comprising:
   configuring single ported memories to store addresses and instructions in the cache memory;
   configuring a logic to implement a multi-stage pipeline where operations for performing a set of cache events are assigned to stages in the multi-stage pipeline to minimize access conflicts to the single ported memories; and
   operably connecting a cache control logic to the single ported memories where the cache control logic controls processing of the set of cache events using at least the multi-stage pipeline to coordinate a sequence of processing the set of cache events.

22. The method of claim 21 including configuring the cache control logic to statically allocate access to the single ported memories based on the assigned stages.

23. The method of claim 21 further including operably connecting multiple levels of cache memory to the microprocessor.

24. A method processing cache events for a single-ported cache, comprising:
   maintaining a pipeline that sequentially cycles through a plurality of stages, the plurality of stages being configured to define a sequence for performing each of the cache events where the sequence minimizes access conflicts between the cache events;
   in response to receiving a cache event, determining when to process the cache event based on the sequence defined by the pipeline; and
   processing the received cache event based on at least a current stage of the pipeline and the defined sequence for performing the received cache event.

25. The method as set forth in claim 24 where processing the received cache event is delayed until the pipeline is in a stage that is defined as a starting stage for the received cache event.

26. The method as set forth in claim 24 where the pipeline includes a number of stages and the method includes sequentially cycling through the stages based on a clock cycle.

27. A system, comprising:
   means for storing contents within an instruction cache and having a single port for accessing the contents;
   means for providing a multi-stage pipeline where operations for performing a set of cache events are associated to stages in the multi-stage pipeline to minimize access conflicts to the memory means; and
   means for processing the set of cache events that may be received by the instruction cache using at least the pipeline means to coordinate a processing order of the cache events.

28. The system of claim 27 where the means for storing contents includes at least a tag array and a data array.

29. The system of claim 27 where the means for providing a multi-stage pipeline includes a means for sequentially cycling through the stages of the multi-stage pipeline.

30. The system of claim 27 where the means for processing the set of cache events is configured to delay processing of a received cache event is delayed until the multi-stage pipeline is in a stage that is defined as a starting stage for the received cache event.

* * * * *